US010679477B2

(12) United States Patent
Kobayashi et al.

(10) Patent No.: US 10,679,477 B2
(45) Date of Patent: Jun. 9, 2020

(54) MULTICAMERA VIDEO ALARM SYSTEM FOR REMOTE MONITORING AND METHOD

(71) Applicants:Herbert S Kobayashi, Webster, TX (US); Phillip C. Lipoma, Dickinson, TX (US)

(72) Inventors: Herbert S Kobayashi, Webster, TX (US); Phillip C. Lipoma, Dickinson, TX (US)

( * ) Notice: Subject to any disclaimer, the term of this patent is extended or adjusted under 35 U.S.C. 154(b) by 484 days.

(21) Appl. No.: 15/149,422

(22) Filed: May 9, 2016

(65) Prior Publication Data
US 2017/0323544 A1    Nov. 9, 2017

(51) Int. Cl.
*G08B 13/196* (2006.01)
*H04B 1/69* (2011.01)

(52) U.S. Cl.
CPC ... *G08B 13/19671* (2013.01); *G08B 13/1966* (2013.01); *G08B 13/19634* (2013.01); *G08B 13/19643* (2013.01); *G08B 13/19645* (2013.01); *G08B 13/19669* (2013.01); *G08B 13/19697* (2013.01); *H04B 1/69* (2013.01)

(58) Field of Classification Search
CPC ...... G06K 9/00771; G06T 2207/30232; H04N 7/18; G08B 13/194; G08B 13/196
See application file for complete search history.

(56) References Cited

U.S. PATENT DOCUMENTS

| | | | | | |
|---|---|---|---|---|---|
| 5,041,901 | A | * | 8/1991 | Kitano | H01L 23/49582 257/669 |
| 5,041,909 | A | * | 8/1991 | Okano | H04N 5/9205 348/385.1 |
| 5,448,290 | A | * | 9/1995 | VanZeeland | H04N 7/181 348/153 |
| 5,969,755 | A | * | 10/1999 | Courtney | G06F 17/3079 348/135 |
| 6,313,872 | B1 | | 11/2001 | Borg | |

(Continued)

OTHER PUBLICATIONS

W.T. Chen, P.Y. Chen, W.S. Lee, & C.F. Huang, "Design and Implementation of a Real Time Video Surveillance System with Wireless Sensor Networks", 2008 IEEE Vehicular Tech. Conf. 208-212 (May 2008) (Year: 2008).*

(Continued)

*Primary Examiner* — David N Werner
(74) *Attorney, Agent, or Firm* — Kenneth L. Nash; Thomas D. Nash

(57) ABSTRACT

A television based alarm system provides video streams from multiple cameras produced at a first location that is transmitted via a radio transmitter to a secondary location. Motion detector signals from a plurality of motion detectors at the first location are utilized to indicate when and which cameras are likely to see an intruder based on when and which motion detectors are tripped. In a first type of encoder/decoder, motion detectors are connected to LEDS for encoding and then decoded utilizing photo electric cells. In another encoder/decoder, motion detector signals are used to produce a digital word that is added to the video signal and then decoded as a digital word. An output device such as a printer can be used to print the motion detector number, date, and time print out and sound an alarm.

17 Claims, 7 Drawing Sheets

(56) References Cited

U.S. PATENT DOCUMENTS

| | | | |
|---|---|---|---|
| 6,433,683 B1* | 8/2002 | Robinson | G08B 13/19647 340/426.16 |
| 6,476,858 B1 | 11/2002 | Ramirez et al. | |
| 6,657,553 B1 | 12/2003 | Bergman et al. | |
| 6,975,220 B1* | 12/2005 | Foodman | G06F 17/3089 340/531 |
| 7,310,110 B2 | 12/2007 | Grindstaff et al. | |
| 7,522,745 B2 | 4/2009 | Grasso et al. | |
| 7,643,653 B2 | 1/2010 | Garoutte | |
| 7,746,223 B2* | 6/2010 | Howarter | G08B 3/10 340/13.31 |
| 7,843,336 B2 | 11/2010 | Kucharyson | |
| 8,711,217 B2 | 4/2014 | Venetianer et al. | |
| 8,902,311 B2 | 12/2014 | Poder | |
| 9,208,669 B2 | 12/2015 | M | |
| 9,472,070 B2* | 10/2016 | Chen | G08B 13/19619 |
| 9,571,712 B2* | 2/2017 | Chen | F21V 23/003 |
| 2002/0005894 A1* | 1/2002 | Foodman | G08B 13/19645 348/143 |
| 2007/0132849 A1* | 6/2007 | Hill | G08B 13/1966 348/159 |
| 2007/0171049 A1* | 7/2007 | Argasinski | G08B 13/19656 340/539.13 |
| 2008/0080776 A1* | 4/2008 | Urban | G08B 13/19671 382/232 |
| 2008/0150716 A1* | 6/2008 | Huang | G08B 3/10 340/540 |
| 2008/0303661 A1* | 12/2008 | Chick | G08B 13/19 340/541 |
| 2009/0028512 A1* | 1/2009 | Burke | H04L 67/12 386/326 |
| 2011/0043629 A1* | 2/2011 | Owen | G08B 13/19671 348/143 |
| 2014/0132419 A1* | 5/2014 | Schumann | G08B 5/36 340/815.45 |
| 2014/0132762 A1* | 5/2014 | Ricard | H04N 7/18 348/143 |
| 2014/0300735 A1* | 10/2014 | Reibel | H04N 7/18 348/143 |
| 2014/0368649 A1* | 12/2014 | Chen | H04N 7/183 348/143 |
| 2015/0179219 A1* | 6/2015 | Gao | G06K 9/00664 386/278 |
| 2015/0254972 A1* | 9/2015 | Patterson | G08B 29/185 340/545.1 |
| 2017/0076588 A1* | 3/2017 | Naylor | G08B 29/185 |

OTHER PUBLICATIONS

A. Wood, G. Virone, T. Doan, Q. Cao., L. Selavo, Y. Wu, L. Fang, Z. He,, S. Lin, & J. Stankovic, "ALARM-NET: Wireless Sensor Networks for Assisted-Living and Residential Monitoring", U. of Va. (2006) (Year: 2006).*

P. Chen, P. Ahamamad, C. Boyer, S.I. Huang, L. Lin, E. Lobaton, M. Meingast, S. Oh, S. Wang, P. Yan, A. Yang, C. Yeo, L.C. Chang, J.D. Tygar, & S.S. Sastry, "CITRIC: A Low-Bandwidth Wireless Camera Network Platform", presented at 2 ACM/IEEE Int'l Conf. on Distributed Smart Cameras (Sep. 2008) (Year: 2008).*

R. Cucchiara, "Multimedia Surveillance Systems", Proc. of the 3d ACM Int'l Workshop on Video Surveillance & Sensor Networks 3-10 (Nov. 2005) (Year: 2005).*

* cited by examiner

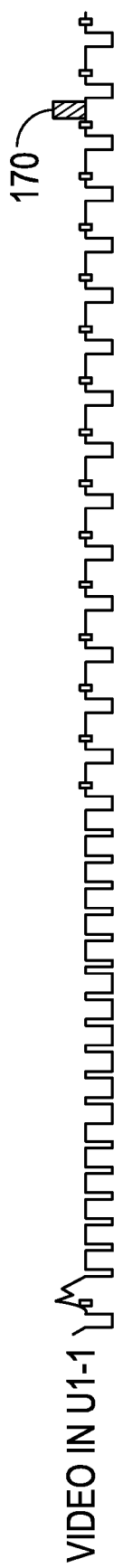

MULTICAMERA VIDEO ALARM SYSTEM FOR REMOTE MONITORING AND METHOD

BACKGROUND OF THE INVENTION

Field of the Invention

The present invention relates generally to alarm systems with multiple video monitor screens transmitted to an offsite location and, more specifically, to a radio broadcast video based alarm system transmitted with separate motion detector information at the offsite location to indicate which video monitors are subject to a triggering event and automatic logging of the event.

Background of the Invention

Prior art remote surveillance security systems for remote viewing use a separate digital selective calling (DSC) for discrete detectors that provides a notification by telephone of an alarm. The DSC used to report triggers is a separate system which costs additional to users. Callers who report an alarm do not indicate the location of the alarm detector. To the extent that Internet service is used to transmit the video feeds to an offsite location, Internet service is costly, somewhat unreliable, and may easily be interrupted. To the extent radio transmitters are utilized, prior art transmitter/receiver systems are subject to significant interference in populated areas. When a link is interrupted between the radio transmitter and receiver, then the computers involved need to be reset. When the DSC notifies the alarm to the user, the user must manually determine which video is involved and then ascertain if the object detected is an alarm event or is not relevant.

As noted above, the disadvantages of the prior art include the significant costs, the unreliability, radio frequency interference in the radio broadcast system, requirement of frequent computer resets, additional costs of DSC, time lags between activation and manual checking of videos, lack of logging of time and dates.

The following patents discuss background art related to the above discussed subject matter:

U.S. Pat. No. 8,902,311—A security system that can be used in a home, office, or other building in order to generate alarms or take other actions depending on conditions within the building. The security system may rely on sensors within the building which sense various conditions and collect other data. The information learned from the sensors can be communicated to a location outside the building for processing, such as, but not limited to, processing associated with a need to instigate an alarm.

U.S. Pat. No. 8,711,217—A video surveillance system is set up, calibrated, tasked, and operated. The system extracts video primitives and extracts event occurrences from the video primitives using event discriminators. The system can undertake a response, such as an alarm, based on extracted event occurrences.

U.S. Pat. No. 7,643,653—The present invention involves a system for automatically screening closed circuit television (CCTV) cameras for large and small scale security systems, as used for example in parking garages. The system includes six primary software elements, each of which performs a unique function within the operation of the security system to provide intelligent camera selection for operators, resulting in a marked decrease of operator fatigue in a CCTV system. Real-time image analysis of video data is performed wherein a single pass of a video frame produces a terrain map which contains parameters indicating the content of the video. Based on the parameters of the terrain map, the system is able to make decisions about which camera an operator should view based on the presence and activity of vehicles and pedestrians, furthermore, discriminating vehicle traffic from pedestrian traffic. The system is compatible with existing CCTV (closed circuit television) systems and is comprised of modular elements to facilitate integration and upgrades.

U.S. Pat. No. 7,843,336—A system includes a plurality of sensors and a monitoring system that are capable of wireless communication. A first of the sensors senses information relating to a specified condition and sends a wireless message with information relating to the specified condition to a second of the sensors. The first sensor also sends another wireless message relating to the specified condition to the monitoring system. The second sensor may also sense information relating to the specified condition, and the message sent to the monitoring system may include information derived from the information sensed by both the sensors. The second sensor may modify its functionality in response to the wireless message sent by the first sensor.

U.S. Pat. No. 6,657,553—A method and apparatus are provided for collecting and disseminating information regarding a protected space. The method includes the steps of detecting a signal event of the protected space, coding the signal event into a packet message and transferring the coded packet message to a database through an internet connection between the protected space and the database. The method further includes the steps of storing the coded message packet in a secure storage area of the database under a password assigned to a manager of the protected space and providing access to information of the coded message packet through an Internet connection between the manager and the database based upon the password assigned to the manager.

U.S. Pat. No. 6,476,858—A computer-based system employing video capture, video motion detection, digital I/O and communications technology is applied to monitoring and security applications. Video information from one or more analog or digital cameras, is independently converted into digital form, optionally displayed in computer monitor on separate resizable windows, analyzed for motion and/or transmitted via the Internet or other networks. Motion detection or event triggers may be derived from a plurality of sources including analysis of digitized camera video signals, motion detector devices, signals from alarm systems, X10 motion sensors or cameras with built-in motion detection. Once a trigger event occurs, software compresses the digitized camera image, stores it in a local database, converts it to an Internet mail binary file format, and sends the file to the address of a recipient. Alternatively, a beeper or direct phone call may be sent in response to alarm condition. A remote monitoring feature allows the system user to monitor either database or live video images from a plurality of remote locations.

U.S. Pat. No. 6,313,872—The security system for homes and small offices provides snapshots of potential trespassers for viewing on conventional television receivers. The system consists of at least one scene capture unit, a scene recovery unit, and communication links between the scene capture units and the scene recovery unit. A scene capture unit consists of a motion detector, a conventional television camera, and circuitry which converts the camera signal into a sequence of integers that is stored in semiconductor memory and then communicated to the scene recovery unit.

The scene recovery unit generates from the sequence of integers communicated by the scene capture unit a signal which, when fed into a conventional television receiver, causes the scene recorded by the camera to be displayed on one portion of the television screen and the time of occurrence to be displayed on another portion. In those situations where building access by authorized persons is significant, the scene capture unit is equipped with an event detector which aborts the processing of snapshots taken of authorized persons either entering or leaving the building.

There exists a need for an improved remotely viewable alarm system. Consequently, those skilled in the art will appreciate the present invention.

SUMMARY OF THE INVENTION

A primary object of the present invention is to provide an improved, low cost, continuous, remotely viewable security and alarm system.

Another object of the present invention is to provide an improved security and alarm system with discrete detectors transmitted with video information that indicate which camera to review when an alert occurs.

Yet another object of the present invention is to provide an encoder to transmit discrete detector information with video fees to a remote location.

Still another object of the present invention is to provide a first type of encoder/decoder that utilizes LEDs and photocells to transmit discrete detector information to produce alerts at a remote location.

Still another object of the present invention is to provide a second type of encoder/decoder that utilizes registers to transmit discrete detector information to produce alerts at a remote location.

These and other objects, features, and advantages of the present invention will become clear from the figures and description given hereinafter. It is understood that the objects listed above are not all inclusive and are only intended to aid in understanding the present invention, not to limit the bounds of the present invention in any way.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a surveillance system for radio transmission of surveillance information from a first location to a second location, including: a plurality of cameras mountable at the first location in a plurality of different positions, the plurality of cameras being operable to produce video information; a plurality of motion sensors, respective of the plurality of motion sensors being positioned in a known relationship for association with respective of the plurality of cameras so that when a respective motion sensor is tripped then a respective camera is indicated, the plurality of motion sensors producing a plurality of motion sensor outputs; an encoder that receives the video information and combines the video information with the plurality of motion sensor outputs to produce the surveillance information; a radio transmitter to transmit the surveillance information from the first location; a radio receiver to receive the surveillance information at the second location; a decoder at the second location that decodes the surveillance information to produce an alert signal indicative of when and which motion sensor is tripped from the plurality of motion sensors; and a monitor at the second location connected to the radio receiver, the monitor being operable to display a portion of the video information based on the alert signal indicative of when and which motion sensor is tripped from the plurality of motion sensors. Other embodiments of this aspect include corresponding computer systems, apparatus, and computer programs recorded on one or more computer storage devices, each configured to perform the actions of the methods.

Implementations may include one or more of the following features. The surveillance system may further include a video recorder operable to store the video information at the first location, and an additional monitor at the first location operable to display the video information. The surveillance system may comprise a radio transmitter that is a spread spectrum transmitter.

The surveillance system may comprise an encoder of the type that includes a plurality of inputs, each of the plurality of inputs being operatively connected to respective ones of the plurality of motion sensors, the encoder includes a plurality of LEDs mounted in an enclosure, the LEDs being responsive to the plurality of motion sensors to indicate which of the plurality of motion sensors have been tripped and which of have not been tripped, an encoder camera mounted to the enclosure and being positioned to produce an encoder video showing which LEDs are activated, the encoder camera being interconnected with the plurality of cameras to produce the surveillance information. The surveillance system where the decoder includes a plurality of photo cells mounted to a display screen, the display screen receiving the encoder video of the plurality of LEDs, the plurality of photo cells producing a plurality of photo cell outputs that indicate which of the plurality of motion sensors have been tripped and which of have not been tripped. Implementations of the described techniques may include hardware, a method or process, or computer software on a computer-accessible medium.

The surveillance system may comprise an encoder of the type that includes a plurality of inputs, each of the plurality of inputs being operatively connected to respective ones of the plurality of motion sensors, the encoder including an integrated circuit register operable to produce a digital word, the digital word being representative of which the plurality of motion sensors have been tripped and which of have not been tripped, the encoder being configured to add the digital word to the video information prior to the video information being broadcast by the radio transmitter.

The surveillance system may further comprise a spread spectrum receiver, the decoder retrieving the digital word for connection to an output device. The surveillance system further including a printer connected to print out when and which motion sensor is tripped from the plurality of motion sensors.

In another embodiment of the present invention, a method for a surveillance system for radio transmission of surveillance information from a first location to a second location is disclosed, comprising providing a plurality of cameras mountable at the first location in a plurality of different positions, the plurality of cameras being operable to produce video information; positioning a plurality of motion detectors in a known relationship for association with respective of the plurality of cameras whereby when a respective motion detector is tripped then a respective camera is indicated, the plurality of motion detectors produce a plurality of motion detector outputs. Further steps include providing an encoder that receives the video information and combines the video information with the plurality of motion detector outputs to produce the surveillance information, providing a radio transmitter to transmit the surveillance information from the first location, providing a radio receiver to receive the surveillance information at the second location, providing a decoder at the second location that decodes the surveillance information to produce an alert signal indicative of when and which motion detector is tripped from the plurality of motion detectors, and connecting a monitor at the second location to the radio receiver, the monitor being operable to display a portion of the video information based on the alert signal indicative of when and which motion detector is tripped from the plurality of motion detectors.

The method may further include the steps of providing a DVR operable to store the video information at the first location, and an additional monitor at the first location operable to display the video information, and providing the radio transmitter is a spread spectrum transmitter.

Another step may comprise operatively connecting a plurality of inputs to respective ones of the plurality of motion detectors. The encoder comprises a plurality of LEDs mounted in an enclosure whereby the LEDs are responsive to the plurality of motion detectors to indicate which of the plurality of motion detectors have been tripped and which of have not been tripped, and further mounting an encoder camera to the enclosure and positioning it to produce an encoder video showing which LEDs are activated, the encoder camera being interconnected with the plurality of cameras to produce the surveillance information.

A further step may include providing the decoder comprises a plurality of photo cells mounted to a display screen, the display screen receiving the encoder video of the plurality of LEDs, the plurality of photo cells producing a plurality of photo cell outputs that indicate which of the plurality of motion detectors have been tripped and which of have not been tripped.

Other method steps may include providing a spread spectrum receiver and having the decoder retrieve the digital word for connection to an output device, and connecting a printer to print out when and which motion detector is tripped from the plurality of motion detectors.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

FIG. 8 is a diagram of a video signal showing the location of storage of a digital word in the video signal representing the status of a plurality of detectors in accord with one possible embodiment of the present invention.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
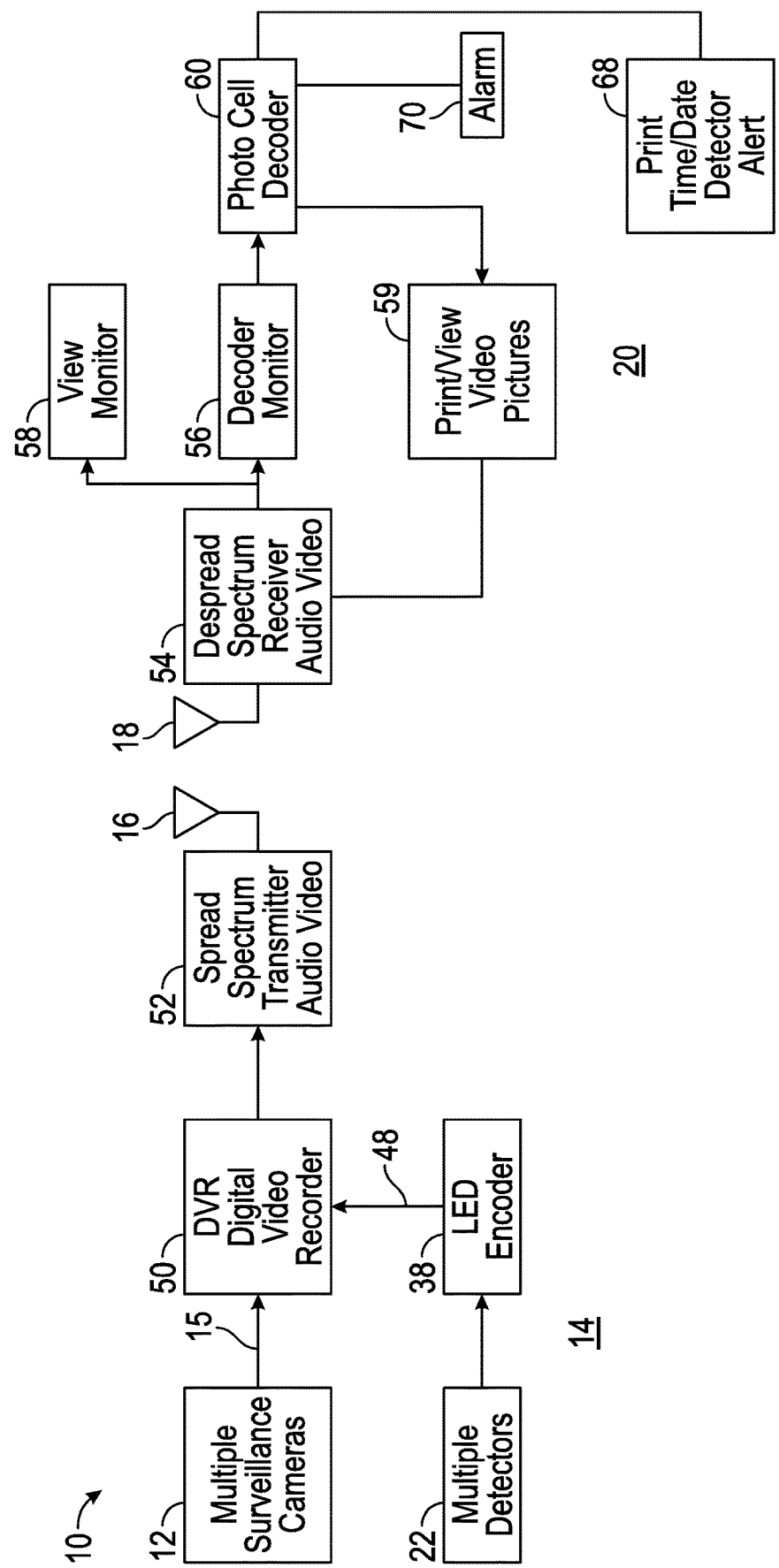
FIG. 1A is a block diagram for radio transmission of surveillance information from a first location to a second location in accord with one possible embodiment of the present invention.
Figure 2:
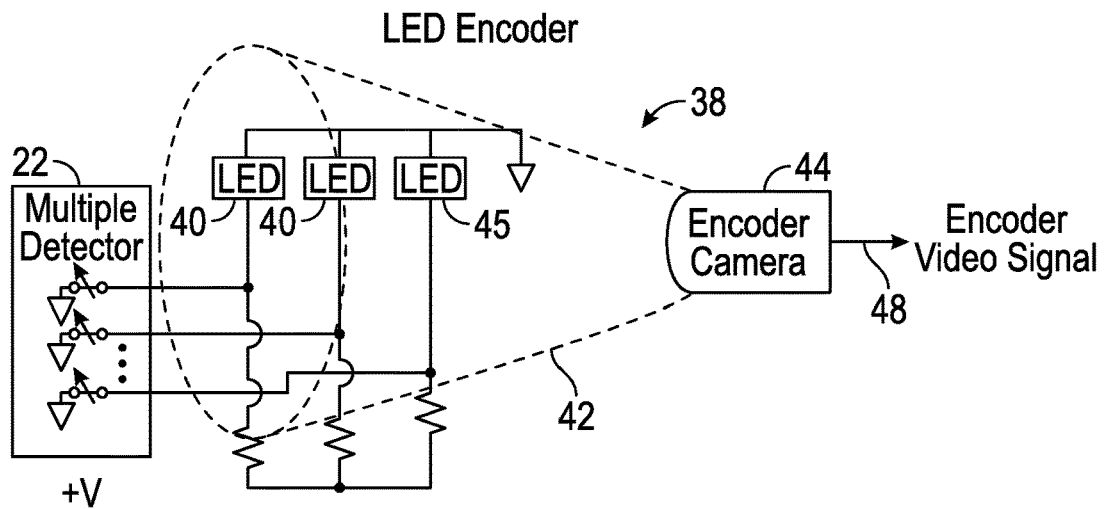
FIG. 2 is a diagram of an LED encoder in accord with one possible embodiment of the present invention.
Figure 3:
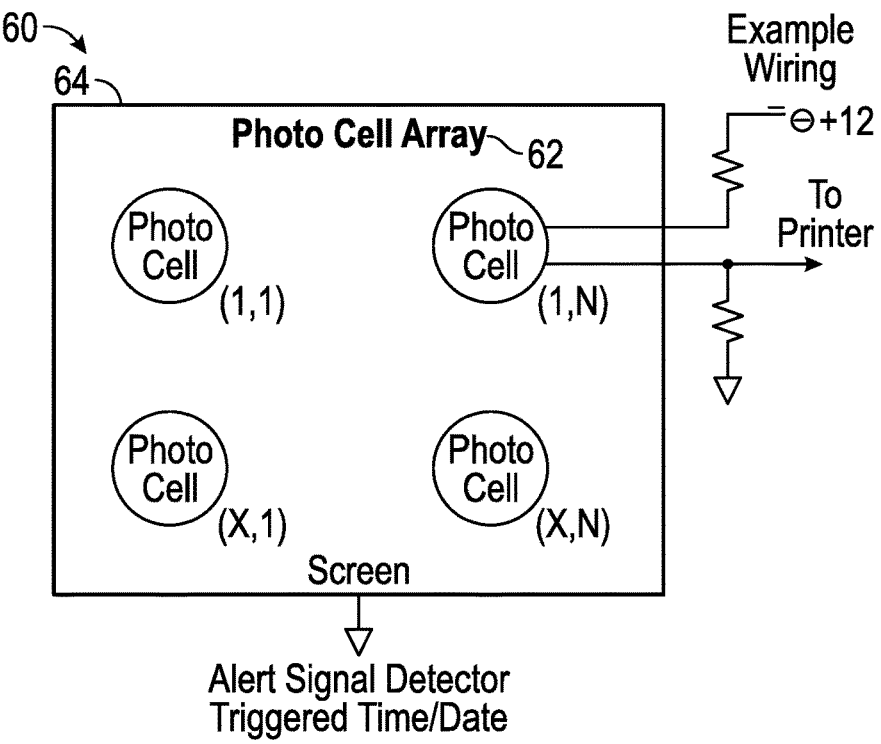
FIG. 3 is a diagram of a photo cell decoder in accord with one possible embodiment of the present invention.
Figure 5:
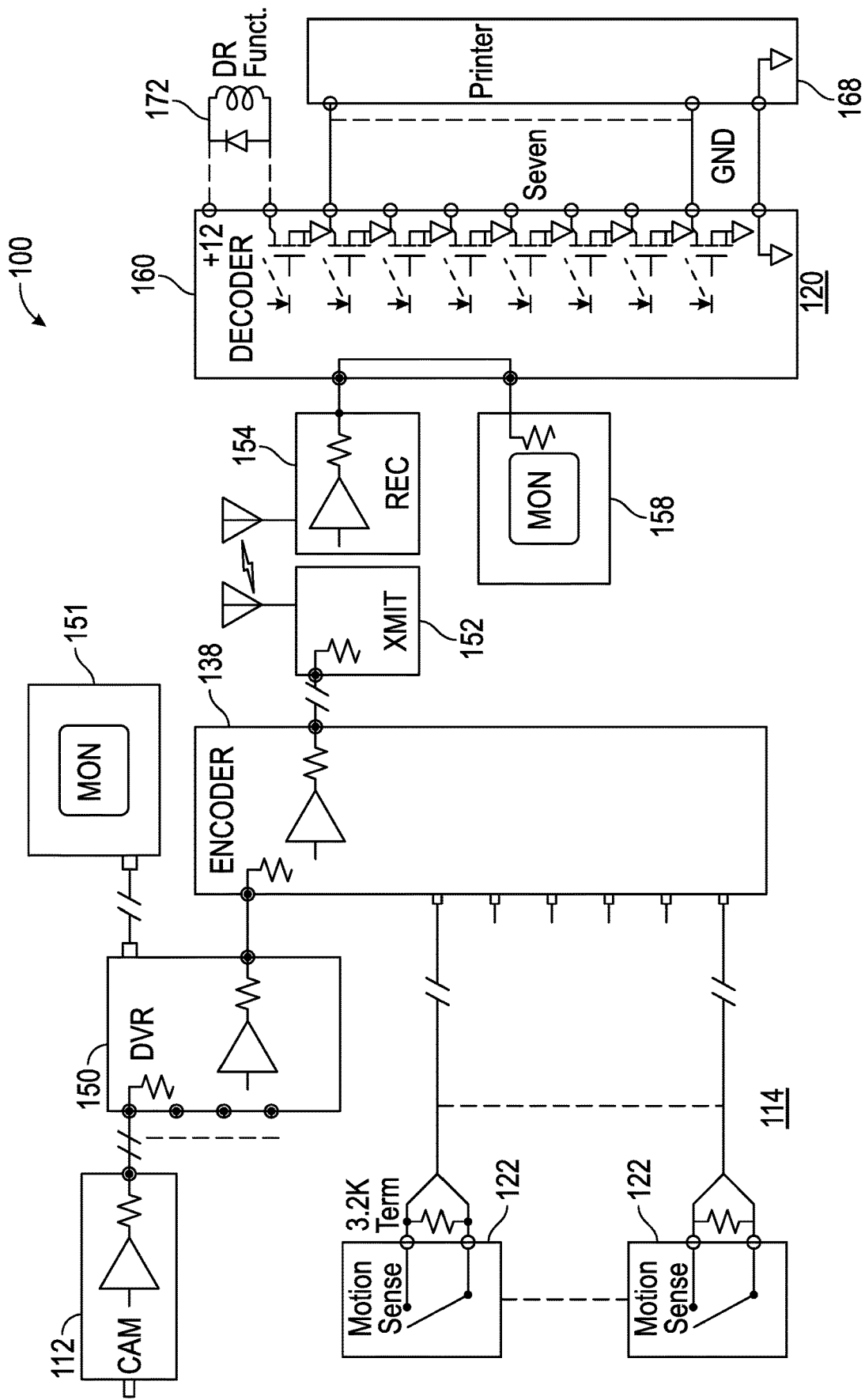
FIG. 5 is a block diagram for radio transmission of surveillance information from a first location to a second location in accord with another possible embodiment of the present invention.

Referring now to the drawings and more specifically to FIG. 1A, FIG. 2, and FIG. 3, there is shown a first general embodiment of a surveillance system in accord with the present invention, namely surveillance system 10 and components thereof are shown. FIG. 5 shows another embodiment of a surveillance systems in accord with the present invention, which is referred to as surveillance system 100.

Figure 1B:
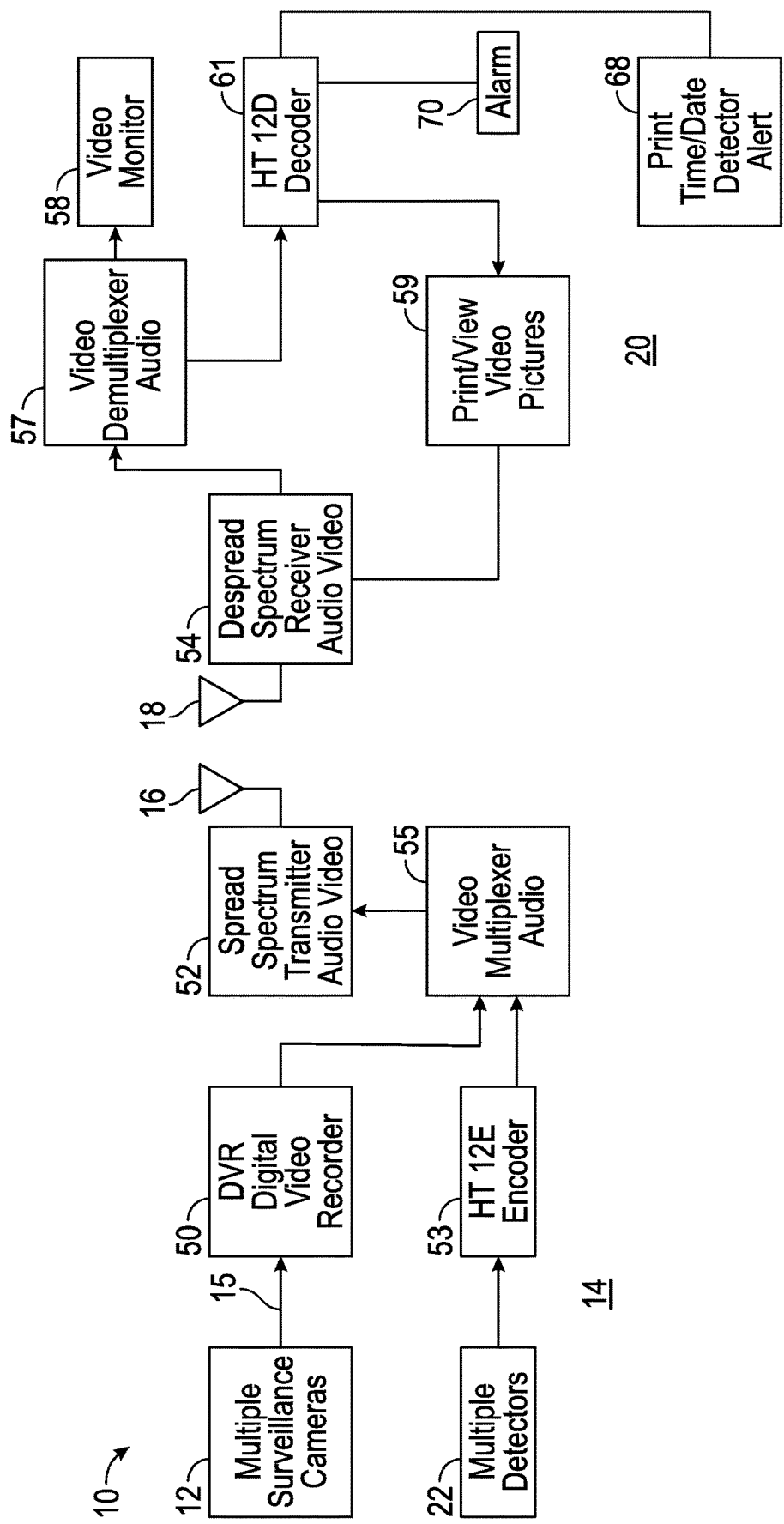
FIG. 1B is a block diagram for radio transmission of surveillance information from a first location to a second location utilizing video multiplexor and demultiplexor in accord with another possible embodiment of the present invention.

As indicated in FIG. 1A, FIG. 1B, multiple cameras 12 are mounted at a plurality of different position in first location 14. Multiple cameras 12 produce video/audio information, such as plurality of video/audio streams 15, which is transmitted via transmitter antenna 16 to receiver antenna 18 for use at a second location 20.

Figure 4:
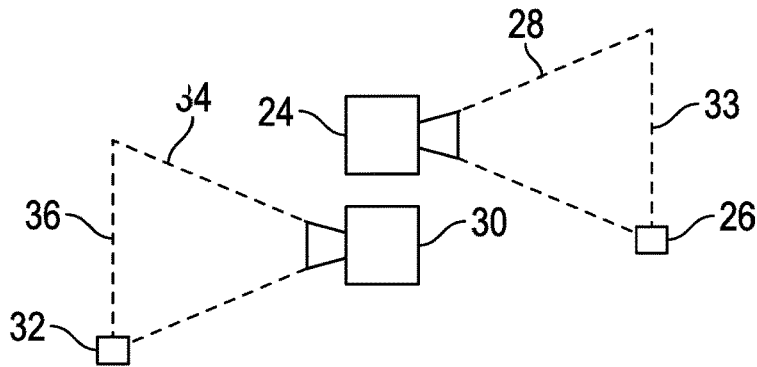
FIG. 4 is a diagram of surveillance cameras in a predetermined relationship with detectors in accord with one possible embodiment of the present invention.

Multiple detectors 22 are positioned in a known physical relationship with respect to plurality of cameras 12 as indicated in FIG. 4. For instance, in FIG. 4 motion sensor 26 produces a trip path 33 that is in the field of vision 28 of camera 24. So if an intruder were to step through trip path 33, then camera 24 would be well positioned to see the intruder. Likewise, camera 30 has a field of view 34 that is well positioned to see if an intruder steps through the trip path 36 of motion sensor 32. In other cases, more than one camera may be associated with one detector, multiple detectors could be associated with one camera, or multiple detectors may indicate multiple cameras. However, each detector will be associated with one or more specific cameras making it possible for a user to view a camera based on an alert from a detector. In another embodiment, the remote viewing monitor may be programmable to be automatically selected when an alert occurs for a specific detector associated with a specific camera based on the output of a decoder at the second location. Two types of decoders are discussed herein.

Generally it will be understood that there will be more than two cameras and perhaps typically six or more cameras. If an alarm is tripped by one of the motion detectors to produce an alert signal at second location 20, then due to the known physical association between cameras and detectors, a user will know which camera feed to review if the user knows which detector was tripped.

While the term motion detector is used in the claims, it will be understood that other types of sensors or detectors could also be used such as smoke, fire, CO2 detectors, temperature, wind speed, rain, gas, pollution, radiation, and the like so that motion detectors refers to other types of detectors which could produce information viewed by a particular camera. As well, many types of motion sensor detectors could be used such as radar, thermal, magnetic, ultrasonic or the like. Detectors may or may not be automatically reset after time or may require manual resetting.

Referring again to FIG. 1A, the signals from multiple detectors 22 are connected to LED encoder 38. A more detailed view of LED encoder 38 is shown in FIG. 2. LED encoder 38 comprises LED array 40, which preferably includes as many LEDs as cameras, mounted within a dark enclosure 42. LED array 40 is connected to multiple detectors 22 as discussed above so that each detector operates a respective LED. In this embodiment, the switches for each detector may be normally closed but then opened when the detector is tripped. Tripping of one of the detectors turns on the respective LED for that detector within LED array 40. Each LED for each detector has a known position within LED array 40. Camera 44 takes a video of the LED array 40 so that the video provides information that shows whether any detector has been tripped. A decoder is used as explained hereinafter to provide an alert signal that provides a signal as to when and which detector is tripped.

In more detail, the anode of each LED in array 40 in one embodiment is connected to a one megaohm resistor or other suitable resistor and then connected to +12 vdc. The cathode of each LED is connected to ground so that the LED would turn on if not for the normally closed switches of the detectors 22 that connect to ground. A switch of a respective detector is also connected to the anode to normally prevent power to each LED, thereby resulting in the LED being off. When the respective detector is tripped, the connection to ground is opened and the respective LED lights up. In one embodiment, LED 45 may or another LED may not be connected to a switch but instead may be permanently connected on to indicate that the circuit is operational even when all LEDs are off. In this way, LED 45 or another LED indicates either an active link or off to indicate the link is not active. In another embodiment, all LEDs in the array could be on unless their respective detector is tripped, whereupon when tripped the LED would turn off. The LEDs may be mounted on a flat black PC board within enclosure 42 to provide contrast for encoder camera 44.

The video output 48 of encoder camera 44 is connected to DVR 50 in the same manner as video streams 15 from multiple surveillance cameras 12. The output of DVR 50 connects to radio transmitter 52. Although not shown in FIG. 1A, FIG. 1B, one or more monitors may be provided at location 14 to view the output of DVR 50 for a user at location 14. As well, DVR 50 is not necessarily required and the output of cameras 12, 44 may be sent directly to radio transmitter 52. A DVR may or may not be utilized at remote location 20.

In one possible embodiment, radio transmitter 52 comprises a spread spectrum transmitter for audio and video. A representative model TRD02124RS may be paired with radio receiver 54. The use of spread spectrum transmitter greatly reduces interference especially in crowded regions. The audio channel could be used for encoding and decoding the data in this embodiment or as described in the embodiment of system 100.

The video streams, which may include both video and audio, are combined with the information from the motion detectors to produce what may be referred to herein as surveillance information that is then transmitted from location 14 to location 20.

The transmitter antenna 16 at location 14 and receiver antenna 18 at location 20 are chosen based on the desired range. This could be from 400 ft. to 3 miles or any desired range within that of the transmitter/receiver capability. The transmitted power is regulated/limited by the FCC so that transmitting very long distances may require an FCC license. Radio receiver 54 receives the surveillance information, which is despread to produce audio and video from each of the cameras.

Receiver 54 at location 20 is connected to one or more video monitors, TV set, or the like including decoder monitor 56 and view monitor 58. View monitor 58 may be utilized to view any of the streams of video which may also include audio. If desired and depending on the cost of data, video of the system could also be transmitted over the Internet and viewed on a computer screen instead of and/or in conjunction with or to replace monitor 56 given that information is known as to which camera to view.

Decoder monitor 56 and photo cell decoder 60 are utilized together to obtain the detector information at location 20 that includes which detectors are tripped and when they are tripped. When a detector is tripped at location 14, then an alert signal may be provided at location 20 indicative of when and which motion detector is tripped from the plurality of motion detectors 22. For this purpose, decoder monitor 56 is connected to or used as part of photo cell decoder 60. FIG. 3 shows photo cell array 62 that can be attached to the monitor screen 64 of decoder monitor 56. The photo cells are arranged in the same pattern as the LEDs so that the photo cells are then responsive to LED array 40, which is broadcast to decoder monitor 56. In one embodiment, the photo cells may be arranged in x rows and n columns that corresponds to LEDs arranged in the same manner. Accordingly, if an LED is activated, then a corresponding photo cell will also be activated to indicate tripping of a particular motion detector.

Output from photo cell decoder 60 may sound alarm 70 and be sent to printer 68 to print out the time and date of detectors that are tripped or active. The status of all detectors may be printed each time an alert occurs. As well, a user may utilize monitor 58 to view a particular camera video feed from location 14 that is associated with a particular detector.

An example of wiring is shown with photo cell (1, N) although all photo cells may be wired in a similar manner. The resistance of the photo cells varies from around 100 k ohms when the corresponding LED is dark to 1 k ohms when the LED is turned on. The (1, N) photo cell can be operatively connected to printer 68 to print the time date and sound an alarm 70. The printer may be an ADRINO or CANNON P23DHV. Also the video output from radio receiver 54 could be used to print a surveillance picture with time date on the video when actuated, which could make the printing of detector status unnecessary. System 10 provides a reliable means to remotely monitor a multiple camera/multiple detector system and is low in cost to implement. For fire and police, any problem at location 14 can be identified and a solution can be planned before taking action.

In another embodiment shown in FIG. 1B, the switches of the multiple detectors is connected to encoder 53, which may be an HT12E integrated circuit. The DVR 50 and encoder 53 outputs are connected to audio mechanism and video multiplexor 55, which is then connected to spread spectrum transmitter 52. Video multiplexor 55 may comprise an MC145026P integrated circuit. On the receiver end, demultiplexor 57 may comprise an MC145017P integrated circuit that receives the signal from despread spectrum receiver 54. The output of video demultiplexor 57 goes to video monitor 58 to view a preferred camera based on the detector outputs. Decoder 61, which may comprise an HT12D decoder, can be utilized to determine which video monitor to observe and/or to print the detector status or the like as discussed hereinbefore.

Surveillance system 10 and system 100 described herein could operate with any standard NTSC TV system and operates with many of the visual security TV multi camera systems currently available in the market place. However, the present invention could utilize other TV standards such as but not limited to PAL & SECAM. NTSC is the standard used in the USA while other standards are used in different countries. The primary difference between standards is line numbers and timing. Accordingly, the timing of the NTSC video can be changed to operate with other non-NTSC standards.

Referring now to FIG. 5, there is shown surveillance system 100, which utilizes a different type of encoder/decoder to send discrete motion detector information with the streams of video information from location 114 to location 120.

Multiple video cameras 112 and detectors 122 are the same as those described hereinbefore. The streams of video feeds produce video information (which may also include audio) that may be applied to DVR 150 or watched from monitor 151. In this embodiment, the video information is connected to an encoder 138 that interleaves the output (normally closed relay contacts) of up to seven motion type detectors 122. Utilizing the same equipment, an array of up to $2^7$ detectors could be utilized instead of simply providing a one to one relationship between seven bits and seven detectors. It will be appreciated that any number of detectors and/or video cameras may be utilized and the use of seven detectors is given as an example. The seven bits make up what is referred to herein as a digital word representative of which motion detectors have been tripped and which have not been tripped. The encoder and decoder described herein each comprise an integrated circuit with a register to store and transmit the digital word.

The status of the seven motion detectors 122 is added to video line #14 as indicated in FIG. 8 during vertical blanking. The resulting composite video output from encoder 138, which may also be referred to herein as surveillance information, can then be transmitted to remote monitoring site of location 120 utilizing radio transmitter 152, which is preferably a spread spectrum transmitter for reduced interference in congested areas. The transmitted radio signal is received by despread receiver 154.

At the remote monitoring site location 120, the composite video or surveillance information is routed through decoder 160 before being displayed by monitor 158, printed on printer 168 or recorded on a viewing or recording device. Decoder 160 decodes the status of the seven motion detector signals from detectors 122 that were previously encoded. Decoder 160 provides seven discrete outputs, one for each of the seven motion detectors. It also provides an OR function output of the seven signals that can be used to activate an audio alarm as indicated at 172 and generally produce an alert signal indicative that includes the seven outputs for when and which motion detector is tripped from the plurality of motion detectors 122.

The system response time is one TV field time, 16.6 ms.

Another part of the system is printer 168, which in one embodiment may directly interface with the decoder 160 output. The printer employs thermal type roll paper. The software in the printer controller is presently configured to print the status of the seven motion detectors anytime the status of anyone of the seven changes along with the date and time of day. Printer 168 also employs a uSD memory card that records every print of the printer. The uSD memory card can be removed to transfer data for further data processing and/or storage.

Encoder 138 provides a parallel input as indicated by the parallel inputs of detectors 122. Encoder 138 puts the information into a serial register with outputs that are added to the video signal blanking signal. Decoder 160 does the reverse, provides a serial to parallel register whereby the parallel outputs are provided to printer 168.

Figure 6:
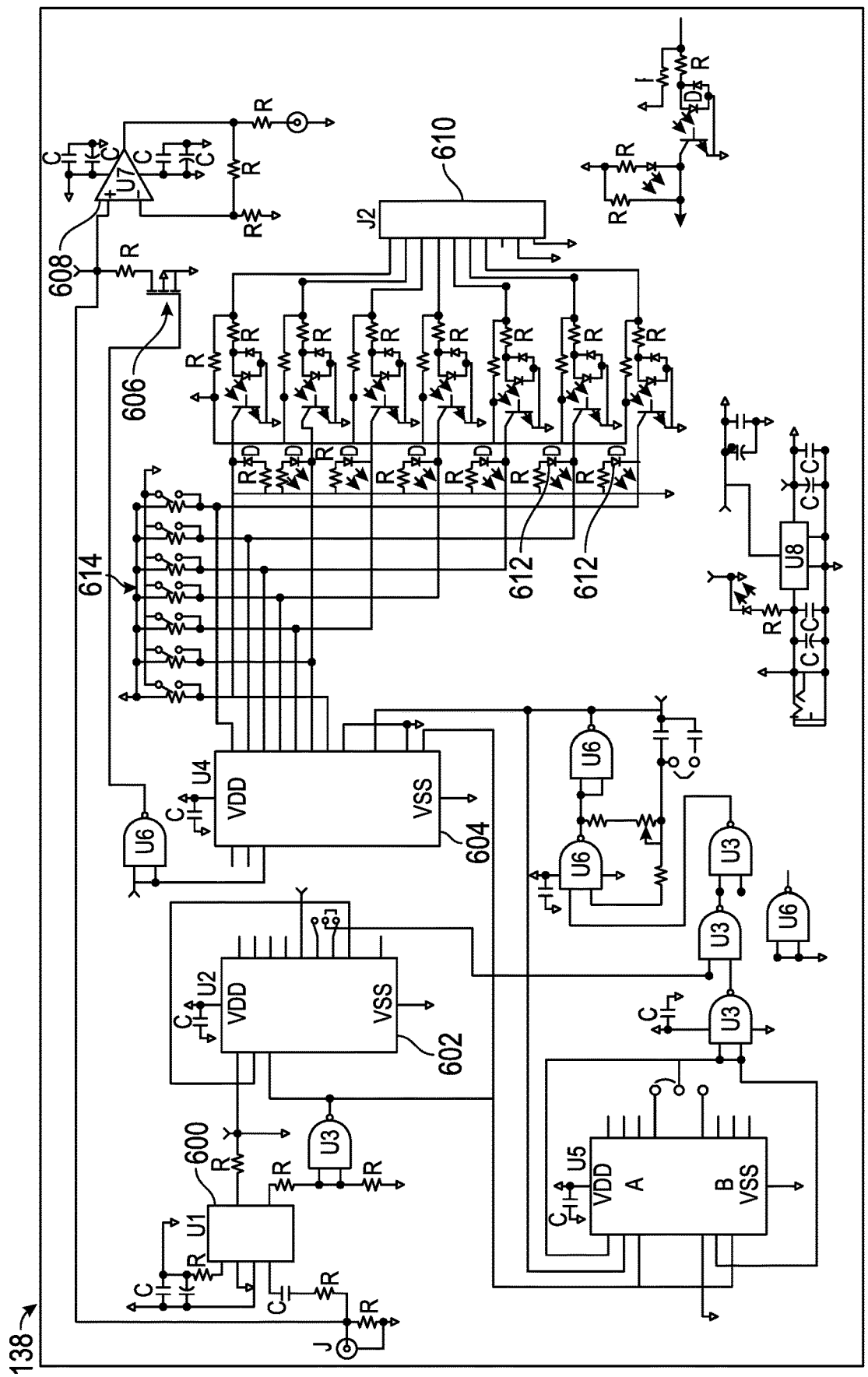
FIG. 6 is a diagram of a digital encoder with a parallel to serial register in accord with one possible embodiment of the present invention.

In more detail, FIG. 6 shows possible circuitry for encoder 138. The encoder 138 employs a TI LMH1980 chip 600 that accepts standard NTSC video and outputs the various components of the video signal, composite sync, vertical sync, horizontal drive, horizontal sync, back porch gate and odd/even gate. The encoder employs the CD4000 CMOS logic. A CD4022 circuit 602 provides a decoded 4 bit binary counter that is reset by vertical sync after which it starts counting the back porch gate. It counts to eight where it is inhibited by the eighth count and remains so until the next vertical sync signal. Count seven is used to open the gate to insert the motion detector data. Count seven represents line #14 after the beginning of vertical blanking where the outputs of the plurality of motion detector outputs 122 is added where indicated at 170 in FIG. 8

The gate (count 7) opened by the CD4022, circuit 602, and is used to generate eight clock pulses. These eight clock pulses are used to clock out the status of the seven motion detectors that are presented to the inputs of circuit 604, a parallel to serial shift register. The circuit requires the last bit OUT of the register to be a zero; hence only seven status lines can be accommodated. The output of the register is then summed into the video signal via an adder component 606 and video amplifier 608.

Encoder inputs 610 are optically coupled for protection and the unit provides seven alarm status lights 612 and a test switch 614 that forces an alarm on anyone of the lines. Encoder 138 is powered by any 9V to 12 VDC wall type power supply.

Figure 7:
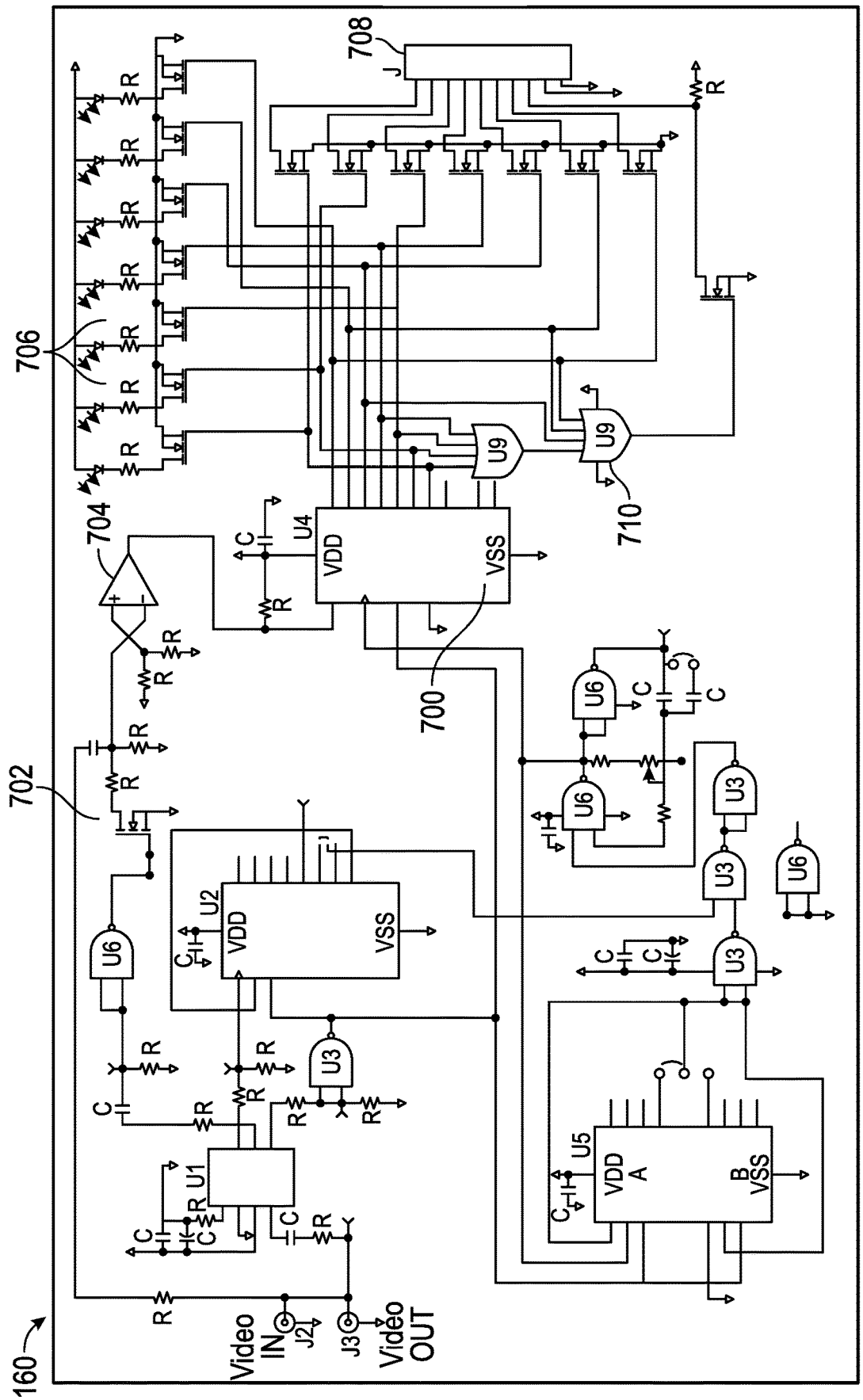
FIG. 7 is a diagram of a digital decoder with a serial to parallel register in accord with one possible embodiment of the present invention.

In more detail, FIG. 7 shows possible circuitry for decoder 160. Decoder 160 employs identical sync separating, line counting and clock pulse generation as does encoder 138. The big difference in decoder 160 is that it employs a serial to parallel shift register for circuit 700 instead of the parallel to serial register circuit 604 used in the encoder 138.

Decoder 160 employs video sync tip clamping via driver 702 and an analog comparator 704 that slices at the center of the inserted data and feeds the serial input to circuit 700. The status of the motion detectors is provided at the outputs of circuit 700 which is used to illuminate status LED's 706 and turn ON a MOSFET driver for each output to provide parallel outputs 708 that correspond to the parallel inputs 610. Circuit 710 provides the OR function, providing a low output when any alert condition is detected. The Decoder is also powered by any 9V to 12 VDC wall power supply.

In summary, surveillance systems 10, 100 provide video streams from multiple cameras at a first location that is transmitted via a radio transmitter. Motion detector signals from a plurality of motion detectors are utilized to indicate when and which cameras are likely to see an intruder based on when and which motion detectors are tripped. In a first type of encoder, motion detectors are connected to LEDS in one camera that when a detector is activated that LED is turned on. The light is picked up by that camera and the video is sent to the TV monitor. A photo electric cell resistance drops due to the TV monitor light which causes the printer to print the detector number, date, and time and emit a sound alarm. Another method described is the video signal is passed thru at the transmitter, but the detector signal is added to the audio band width, 4.5 MHz, by the encoder. The detector signal is decoded at the receiver then connected to the printer for the detector number, date, and time print out with sound alarm.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. While redundant, different methods discussed above could be utilized together if desired. Such modifications and variations that may be apparent to a person skilled in the art are intended to be included within the scope of this invention as defined by the accompanying claims.

The invention claimed is:

1. A surveillance system for radio transmission of surveillance information from a first location to a second location, comprising:
   a plurality of cameras mountable at said first location in a plurality of different positions, said plurality of cameras being operable to produce a plurality of video signals;
   a plurality of motion detectors, respective of said plurality of motion detectors being positioned in a known relationship for association with respective of said plurality of cameras whereby when a respective motion detector is tripped then a respective camera is indicated, at least one motion detector being mounted at a mounting position entirely separate from and spaced apart from a mounting position for an associated camera;
   an encoder comprising a plurality of video inputs and a plurality of motion detector inputs to produce said surveillance information comprising said plurality of video signals and data representative of which of said plurality of motion detectors have been tripped and which have not been tripped;
   a radio transmitter to transmit said surveillance information comprising said plurality of video signals and said data representative of which of said plurality of motion detectors have been tripped and which have not been tripped from said location to said second location;
   a radio receiver to receive said surveillance information at said second location;
   a decoder at said second location that decodes said surveillance information comprising said data representative of which of said plurality of motion detectors have been tripped and which have not been tripped to produce an alert signal indicative of when and which motion detector is tripped; and
   a monitor at said second location connected to said radio receiver, said monitor being operable to display a particular video from a plurality of videos of said surveillance information based on said alert signal,
   wherein said encoder comprises a plurality of inputs, each of said plurality of inputs being operatively connected to respective ones of said plurality of motion detectors,
   said encoder comprises a plurality of LEDs mounted in an enclosure, said LEDs being responsive to said plurality of motion detectors to indicate which of said plurality of motion detectors have been tripped and which have not been tripped,
   an encoder camera mounted to said enclosure and being positioned to produce an encoder video showing which LEDs are activated, said encoder camera being interconnected with said plurality of cameras to produce said surveillance information,
   wherein said encoder video is transmitted to a second location for use with said decoder and wherein said decoder decodes said encoder video to determine which of said plurality of motion detectors have been tripped.

2. The surveillance system of claim 1, further comprising said encoder being operable to place said data representative of which of said plurality of motion detectors have been tripped and which have not been tripped into a vertical blanking portion of a video transmission signal.

3. The surveillance system of claim 1, wherein said encoder is operable to encode said data representative of which of said plurality of motion detectors have been tripped and which have not been tripped from said plurality of motion detectors in a video transmission signal in a different frequency band than used to transmit said plurality of videos from said plurality of cameras.

4. The surveillance system of claim 1, wherein said decoder comprises a plurality of photo cells mounted to a display screen, said display screen receiving said encoder video of said plurality of LEDs, said plurality of photo cells producing a plurality of photo cell outputs that indicate which of said plurality of motion detectors have been tripped and which of have not been tripped.

5. The surveillance system of claim 1, further comprising a plurality of LEDs at said first location representative of which of said plurality of motion detectors has been tripped, and wherein said decoder is operable to produce a video image of said plurality of LEDs at said second location.

6. The surveillance system of claim 5, further comprising a spread spectrum receiver, said decoder comprising a sensor responsive to said plurality of LEDs to control an output device.

7. The surveillance system of claim 6, further comprising a printer connected to print out when and which motion detector is tripped from said plurality of LEDs.

8. The surveillance system of claim 1, wherein said decoder comprises a plurality of photo cells mounted to a display screen, said display screen receiving said encoder video of said plurality of LEDs wherein said display screen displays said encoder video to said photo cells, said photo cells being responsive to said plurality of LEDs displayed from said display screen, said photo cells producing a plurality of photo cell outputs that indicate which of said plurality of motion detectors have been tripped and which have not been tripped.

9. The surveillance system of claim 8, further comprising a plurality of LEDs at said first location representative of which of said plurality of motion detectors has been tripped, and wherein said decoder is operable to produce a video image of said plurality of LEDs at said second location.

10. A method for providing a surveillance system for radio transmission of surveillance system for radio transmission of surveillance information for a first location to a second location, comprising:

providing a plurality of cameras mountable at said first location in a plurality of different positions;

providing a plurality of motion detectors to be positioned in a known relationship for association with respective of said plurality of cameras whereby when a respective motion detector is tripped then a respective camera is indicated;

providing an encoder to produce said surveillance information, said surveillance information comprising a plurality of video signals and data representative of which of a plurality of motion detectors have been ripped and which have not been tripped;

providing a radio transmitter to transmit said surveillance information comprising said plurality of video signals and said data representative of a plurality of motion detector outputs from said first location;

providing a radio receiver to receive said surveillance information at said second location to said second location;

providing a decoder at said second location that decodes said surveillance information comprising said plurality of motion detector outputs to produce an alert signal indicative of when and which motion detector is tripped from a plurality of motion detector inputs to said encoder;

connecting a monitor at said second location to said radio receiver, said monitor being operable to display a particular video from a plurality of videos based on said alert signal;

operatively connecting a plurality of inputs, to respective ones of said plurality of motion detectors, said encoder comprises a plurality of LEDs mounted in an enclosure, said plurality of motion detectors to indicate which of said plurality of motion detectors have been tripped and which of have not been tripped, mounting an encoder camera to said enclosure and positioning said encoder camera to produce an encoder video showing which LEDs are activated, said encoder camera being interconnected with said plurality of cameras to produce said surveillance information and wherein said decoder said encoder video to determine which of said plurality of motion detectors have been tripped.

11. The method of claim 10, further comprising utilizing said encoder to place said surveillance information which is representative of said plurality of motion detector outputs in a vertical blanking portion of a video transmission signal.

12. The method of claim 10, further providing said encoder encodes said plurality of motion detector outputs in a video signal at different frequencies than used to transmit information from said plurality of cameras.

13. The method of claim 10, further comprising providing said decoder comprises a plurality of photo cells mounted to a display screen, said display screen receiving said encoder video of said plurality of LEDs, said plurality of photo cells producing a plurality of photo cell outputs that indicate which of said plurality of motion detectors have been tripped and which of have not been tripped.

14. The method of claim 10, further comprising providing said encoder comprises a plurality of inputs, each of said plurality of inputs being operatively connected to respective ones of said plurality of motion detectors, said encoder comprising an integrated circuit register operable to produce said data representative of which of said plurality of motion detectors have been tripped and which have not been tripped to said surveillance information prior to said surveillance information being broadcast by said radio transmitter.

15. The method of claim 14, wherein said decoder comprises a sensor responsive to a LED to control an output device.

16. The method of claim 15, further comprising operatively connecting a printer to print out when and which motion detector is tripped from said LED.

17. A surveillance system for radio transmission of surveillance information from a first location to a second location, comprising:

a plurality of motion detectors, respective of said plurality of motion detectors being positioned in a known relationship for association with respective of said plurality of cameras whereby when a respective motion detector is tripped then a respective camera is indicated, said plurality of motion detectors producing a plurality of motion detector outputs;

an encoder comprising a plurality of video inputs and a plurality of motion detector inputs to produce said surveillance information, said plurality of video inputs being separate from said plurality of motion detector inputs, said surveillance information comprising said plurality of videos;

a radio transmitter to transmit said surveillance information from said location;

a radio receiver to receive said surveillance information at said second location;

a decoder at said second location that decodes said surveillance information to produce said plurality of videos and an alert signal indicative of when and which motion detector is tripped from said plurality of motion detectors;

a monitor at said second location connected to said radio receiver, said monitor being operable to display a selected of said plurality of videos based on said alert signal indicative of when and which motion detector is tripped from said plurality of motion detectors; and wherein said encoder comprises a plurality of inputs, each of said plurality of inputs being operatively connected to respective ones of said plurality of motion detectors, said encoder comprises a plurality of LEDs mounted in an enclosure, said LEDs being responsive to said plurality of motion detectors to indicate which of said plurality of motion detectors have been tripped and which of have not been tripped, an encoder camera mounted to said enclosure and being positioned to produce an encoder video showing which LEDs are activated, said encoder camera being interconnected with said plurality of cameras to produce said surveillance information, wherein said encoder video is transmitted to a second location for use with said decoder, said decoder comprising a plurality of photo cells mounted to a display screen and wherein said decoder decodes said encoder video to determine which of said plurality of motion detectors have been tripped.

* * * * *